(12) United States Patent
Verona

(10) Patent No.: US 8,161,123 B2
(45) Date of Patent: Apr. 17, 2012

(54) CERTIFIED ELECTRONIC MESSAGING

(76) Inventor: Steven N. Verona, Penn Valley, PA (US)

( * ) Notice: Subject to any disclaimer, the term of this patent is extended or adjusted under 35 U.S.C. 154(b) by 328 days.

(21) Appl. No.: 11/972,872

(22) Filed: Jan. 11, 2008

(65) Prior Publication Data

US 2008/0172469 A1    Jul. 17, 2008

Related U.S. Application Data

(60) Provisional application No. 60/879,922, filed on Jan. 11, 2007.

(51) Int. Cl.
  *G06F 15/16* (2006.01)
(52) U.S. Cl. .................................................. 709/206
(58) Field of Classification Search .................. 709/206
  See application file for complete search history.

(56) References Cited

U.S. PATENT DOCUMENTS

| | | | | |
|---|---|---|---|---|
| 5,956,390 A | * | 9/1999 | McKibben et al. | 379/93.07 |
| 6,307,955 B1 | * | 10/2001 | Zank et al. | 382/121 |
| 6,477,243 B1 | * | 11/2002 | Choksi et al. | 379/100.06 |
| 6,769,012 B1 | * | 7/2004 | Liu et al. | 709/204 |
| 7,283,813 B2 | * | 10/2007 | Hamanaga et al. | 455/415 |
| 7,610,339 B2 | * | 10/2009 | Evans et al. | 709/206 |
| 2003/0193967 A1 | * | 10/2003 | Fenton et al. | 370/490 |
| 2003/0212891 A1 | * | 11/2003 | Evans et al. | 713/168 |
| 2005/0283837 A1 | * | 12/2005 | Olivier et al. | 726/24 |
| 2006/0025112 A1 | * | 2/2006 | Hamanaga et al. | 455/412.1 |
| 2006/0031351 A1 | * | 2/2006 | Marston et al. | 709/206 |
| 2007/0288601 A1 | * | 12/2007 | Barkley et al. | 709/219 |

* cited by examiner

*Primary Examiner* — Jeffrey Pwu
*Assistant Examiner* — Saad A Waqas
(74) *Attorney, Agent, or Firm* — Jason H. Foster; Kremblas & Foster

(57) ABSTRACT

A system whereby a first user can post messages securely to a central data server, which date stamps the messages and permanently records their content and dates. Other authorized users can access the account on the central data server, and preferably can post messages to the same. The dates and content of the messages posted cannot be changed. Thus, the system is a reliable source of information about the content of communications and the dates of receipt by the central data server. Notice can be sent to users by email or otherwise apprising them of a newly posted message.

12 Claims, 1 Drawing Sheet

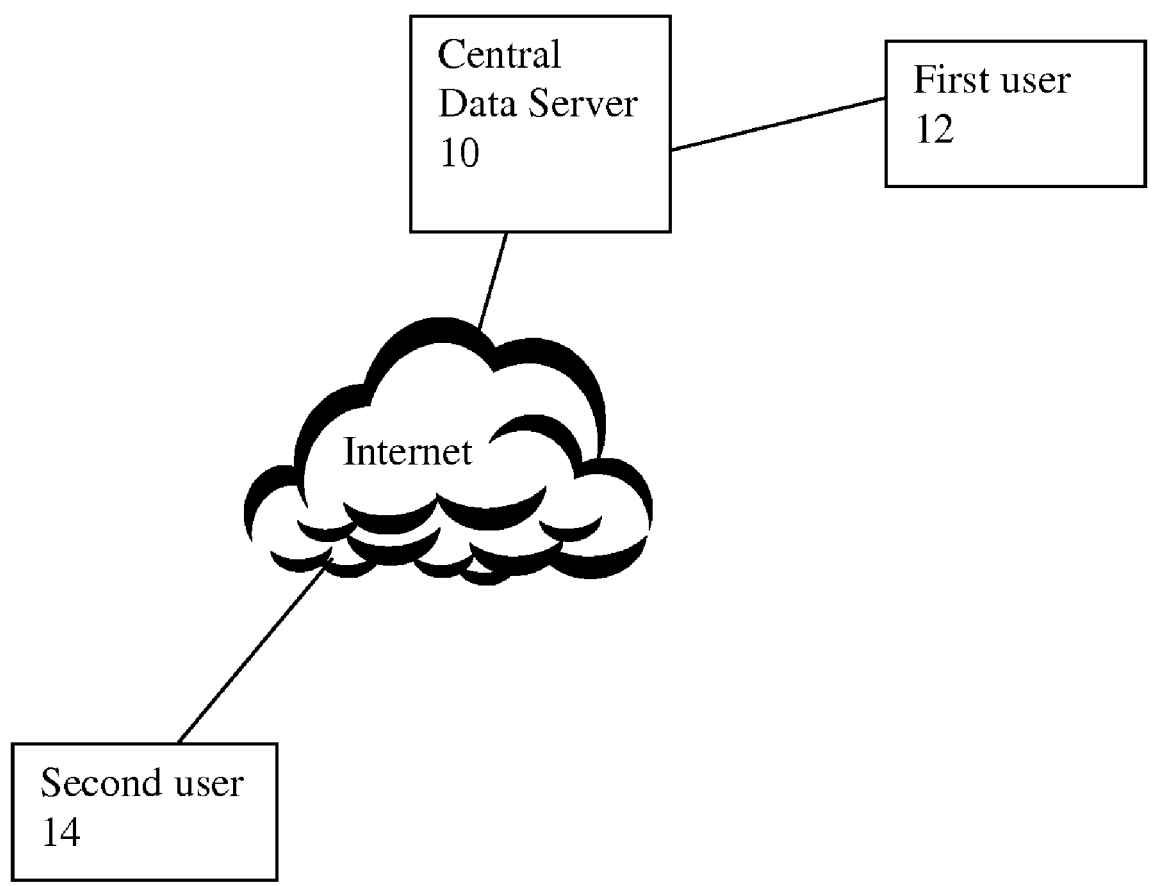

CERTIFIED ELECTRONIC MESSAGING

CROSS-REFERENCES TO RELATED APPLICATIONS

This application claims the benefit of U.S. Provisional Application No. 60/879,922 filed Jan. 11, 2007.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to methods of communicating, and more particularly to methods of communicating that can be shown with reliability to have occurred on a particular date.

2. Description of the Related Art

It is common for the sender of a communication to request that its recipient confirm receipt of the communication. In a common conventional situation, a sender mails a certified letter in an envelope, to which a postcard is attached. Before the letter carrier gives the recipient possession of the letter, the recipient must sign the postcard, which is then sent back to the sender to serve as evidence that the letter was received by the recipient. Unfortunately, those who do not wish to receive such communications can refuse to sign the postcard, thereby leaving the sender with less than strong evidence that the communication was received by the recipient. Even if the recipient signs the postcard, there is no way to prove definitively what the envelope, to which the postcard was attached, contained. Therefore, there is no reliable way to prove that the recipient actually viewed the communication.

It is similarly common for a person to create a record of an occurrence verifiably taking place at a particular date and time. For example, if an inventor wishes to record a date of invention, thereby creating evidence that he or she invented no later than a particular date, he or she will typically file formal documents in the U.S. Patent and Trademark Office that are date-stamped and given a unique identification by a clerk employed by the government entity. However, this process is expensive and time-consuming, and one must wait to find out whether there was receipt by the U.S. Patent and Trademark Office. In the meantime, precious time can be lost.

Therefore, there is a need for a method and/or apparatus that permits users to form reliable evidence that a particular communication was created by a sender as of a particular date. It is also desirable, if the communication is sent to a sender, to form reliable evidence that a recipient received the communication at a particular date.

BRIEF SUMMARY OF THE INVENTION

It is an object of an exemplary embodiment of the present invention to provide a method of forming a permanent record of the creation, sending and/or viewing dates of communications. The embodiment retains a permanent record, which cannot be edited, of communications posted electronically in the system as described herein. This record can be provided as evidence to prove the circumstances surrounding the communication.

The invention contemplates a method of storing a communication comprising a plurality of steps. In one step, a first person gains access to an account on a central data server. This can occur over the internet, for example, or by a computer connected to the first person's computer via a local area network. The first person transmits a first communication to the first person's account on the central data server via a secure electronic connection that is substantially publically inaccessible, such as a secure internet connection or a local area network connection. This step cannot be taken by sending an email. The central data server receives the first communication, and associates with the first communication a date of receipt of the first communication. The central data server stores the first communication and the associated date of receipt, and permits access to the first communication and the associated date of receipt using the account. The central data server also inhibits any modification to the first communication and the associated date of receipt in order to retain a reliable record of the content of the communication and its date of receipt.

It is contemplated that the first person can authorize a second person to access the account. The second person can be notified of the first communication, such as via an email message generated automatically by the central data server. The second person can then view the first communication, such as by accessing the account. If desired, the second person can transmit a second communication to the first person's account on the central data server via a secure electronic connection that is substantially publicly inaccessible. The central data server receives the second communication and associates with the second communication a date of receipt of the second communication. The central data server stores the second communication and the associated date of receipt, permits access to the second communication and the associated date of receipt using the account, and inhibits any modification to the second communication and the associated date of receipt.

BRIEF DESCRIPTION OF THE SEVERAL VIEWS OF THE DRAWINGS

FIG. 1 is a schematic view illustrating an embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

In a preferred embodiment of the invention, shown in FIG. 1, an Internet-based system is shown having a number of interrelated sub-systems. The core of the system is a web-based application that allows users to post and read communications to one another or themselves. An example of the core of the system is a common messaging system used to communicate with, and possibly between members of, a web site that is hosted on a central data server 10. This web site makes accounts available to persons who wish to post to the web site, possibly for a fee, for example, based on the amount of data stored in the account. However, there are some differences between the invention and a typical web site. For example, the only users who can access the postings to an account are those who have authorization, using conventional tools such as user identifications and passwords. Additionally, the communications are posted using a substantially secure form of communication, which does not include conventional email. Still further, once a communication is posted, it cannot be altered or deleted, except as discussed further herein.

The basic embodiment of the account is similar to a bulletin or message board or other thread of communication using Internet protocols. This can be accessed in a manner similar to most web-based systems using conventional internet protocols, such as with a browser. In the preferred embodiment, users set up accounts by entering unique identification data, such as user identifications and passwords. Users can then post messages to the user's account, and other users can access the account if they are authorized by the first user, such as by the first user instructing the web site to permit entry by anyone entering a particular user identification and password at a prompt on a web page. Thus, second and subsequent users are "invited" to join the account or portion of the account to which the first user permits access.

It is contemplated that an account can include a single thread of communications, or multiple threads of communications. If there are multiple threads, then it is preferred that each thread is separated, so that the user can have a single account with separate subsections of the account, each of which is accessible only by those persons the user designates as permitted to access a respective thread. In the typical situation, each other person is only permitted to access one thread of the user's account with a particular user identification and password. However, it is contemplated that the system can be designed to permit a person to access multiple threads with the same user identification and password, so that he or she does not have to have a different user identifications and passwords for each thread.

Using the embodiment described above, a first user 12 can compose and then post messages to the central data server 10, as shown in FIG. 1. The first user 12 can limit viewing of the message to himself or herself, a particular other person, such as the second user 14 (identified by a unique identifier, such as a username) or a particular group of persons as will be understood by the person of ordinary skill. When a first user 12 posts a message or other communication to the central data server 10, the content of the message is stored on the central computer server 10, and has data associated with the message indicating the message was received at a particular date and time.

It is preferred that the data associated with the message include the date and time the message is received by the central data server. These data are recorded with the message itself in such a way as to be unique, such as by automatically creating a one-way message digest (hash key) based on an algorithm, such as the conventional algorithm called "sha1". This provides a one-way function to produce a unique set of numbers based on the content of the posted message and the messages associated data, and because no two messages and dates are the same, therefore no two sets of hash key numbers are the same.

The invention inhibits modification of the communications posted by identifying any changes made to the communication using the hash keys. Furthermore, the invention inhibits modification of communications by providing no tools to the user to modify communications once they are posted. Still further, measures are taken to prohibit modification, such as by software security that prohibits anyone from modifying the text of any posted communication. In this manner, modification is inhibited. Finally, the invention prohibits even administrators of the system from modifying posted communications, thereby further inhibiting any modification. Even if someone breaches all forms of inhibition by accessing the communications internally, the hash key is an inhibitor that will at least identify all communications that have been modified after posting.

The message's content and other information about the message are permanently retained in the server's data storage device, such as a hard drive, along with the unique hash key. Other information related to the communication is also preferably recorded, such as the Internet Protocol (IP) address of the user, the times of login and logout of the user, the keystrokes input by the user, and the time the user dwelled on certain lines of the web pages, are noted as examples, but do not limit the kinds of data that can be retained. Any information associated with the message, the user, the recipient, the communication applications and the geographic location of all parts of the system, can be recorded.

Not all of the information recorded by the central data server must be retained indefinitely. However, it is critical that, after the step of posting the message to the system, the content of the message and at least the date the message was posted are retained indefinitely, and cannot be deleted or altered at any time without verification that alterations have occurred. This combination permits the system to retain the reliability needed, which would be lacking if modifications of the messages or dates were permitted.

In this manner, the invention serves as a public record, even though the records are not made public other than by disclosure by one of the parties, because the administrator of the invention acts as a public agent to testify as to the content and information surrounding each communication. Alternatively, the record can be printed as a certified document, saved on external media with a digital signature, or otherwise made transportable in order to be produced for evidentiary purposes.

Because the administrator and the central data server do not permit alteration of the communications and associated information, the posting of a message creates a permanent record having a verifiable date, and preferably time, of posting with no possibility of changing the information contained within the central data server. Of course, it is possible to delete all records relating to a particular user or part of the account if that user is removed from the system, such as for violating the requirements thereof. Alternatively, it is contemplated that, for example for security reasons or if the communications have become obsolete, all of the parties to the account can agree and the communications and associated data are deleted. It is contemplated that a given user may have multiple accounts or sub-accounts, each of which relates to a different matter, and each of which has a different set of authorized users.

When the second user 14 desires to gain access to the account, he or she may do so by connecting through the internet to the web site and then log into the account using the user identification and password assigned. The second user may then view the message posted by the first user, or ignore the same. The system will preferably store on the central data server the fact of the first user's access to the account, and whether and when he or she views the account messages. The system creates another permanent record about the second user's access to and viewing of the first user's posted message. The second user's times of logging in and out, IP address, keystrokes, etc. can also be recorded permanently. Similarly, this information cannot be amended, and is recorded permanently for later use, if necessary. If other users access the account, that is also recorded, as is any posting of additional messages, such as by the second user.

Using the invention, the sender of a message can prove with reliability the content and date of posting of any communication. Furthermore, if multiple parties are involved, the sender and the recipient can prove the dates and times that one or more communications were transmitted, and viewed by the parties, preferably including the date and time the communications were posted and then viewed by each party, and other information related to the communications as noted herein.

Of course, it is possible for the second user to avoid accessing the system as in the case of ignoring the conventional certified mail described above. However, if that second user logs into the system, whether to view messages that are not from the first user or otherwise, the preferred embodiment of the invention includes the storage of the facts relating to the second user's access. Additionally, in a preferred embodiment, the second user is apprised of the fact that a communication relevant to him or her has been stored in the central data server. This notification can take place by a message "popping up" onto the screen upon signing on, a notice of the message in the "in" box of the core system, an email to the second user or any other conventional means of notifying persons of anything. Preferably, the notification is automated by software in the central data server, and the fact of notification is stored.

If the second user accesses the account, but fails to view the message, the fact of notification combined with a failure to view is recorded and retained by the system. Thus, if a court requires the first and second users to communicate using the present invention, it will be a simple step to show the court that the second user failed to view the posted communication, despite being notified of the same.

The uses for the invention are numerous, and include any communication that one may want to be able to prove has occurred. For example, a lawyer may send communications to another lawyer using the system to prove when a communication was sent along with the date and time that the recipient viewed the message. This eliminates the problem of one party claiming not to have received a message from another party. The system is used to prove when the message was created to eliminate discrepancies related to meeting deadlines in sending messages. The thread of communication is stored permanently and without the ability to alter it.

Another example is the use of the system by divorced parents to communicate about their children. It is common in custody agreements to require certain information to be communicated by one parent to the other. These include health and school matters about the children. By using the invention, a first parent can prove that he or she complied with the court's order by posting a message to the system for the second parent containing the required information. Because a permanent copy of that communication is recorded along with at least a date "stamp", and preferably a time "stamp", the potential liability of the disclosing party is eliminated by eliminating the receiving party's ability to allege that the disclosing party failed to send the required information. Instead, there is a very reliable record of the communication being sent at a particular date and time, and the failure of the recipient to view or login to the system, possibly after being notified. This makes it clear to the court which party is failing to meet his or her requirements. Parents who know that this system is in place will be likely to use the system due to the threat of court sanctions for failure to do so. The reliability of the evidence provided by the invention should essentially eliminate the possibility of parties feigning non-receipt of communications.

If the content of the records is in doubt, or if it is required by the rules of evidence, the administrator of the system, or a competent person with access to the permanent records created in the invention, can bring evidence to the court via testimony, printed documents, electronic media or any other means acceptable to the judicial body. It is in this manner that the system administrator acts as a public agent, because the system administrator provides the evidence to the court about the communications recorded in the system, and does so as an objective witness.

Yet another example of use of the invention is for sending invoices, such as by utility companies. The invention allows for proof of the date and/or time when an invoice is sent and proof of whether and when the recipient views the invoice. This eliminates a common problem associated with emailing invoices, for example the message is not delivered or is "filtered out" automatically by a so-called "spam filter". Using the present invention, the sending party can prove when it sent an invoice, and it can prove when the recipient viewed it (or logged on and was informed of the invoice but failed to view the invoice), thereby eliminating problems associated with a customer saying he or she did not receive a bill on time or at all.

A sub-system of the invention, which is preferably an application within the web-based system or a separate application, allows authorized, or paying, senders to send large numbers of messages, such as for billing or announcements. In this embodiment, the invention offers senders of communications the ability to send "unsolicited" announcements for a fee paid to the administrator of the system, thereby removing these announcements from the "spam" category with guaranteed delivery. This alternative records confirmed receipt of messages.

When an authorized sender seeks to post multiple communications to multiple accounts, a mechanism is provided by the administrator of the central data server to do so without the requirement of manually accessing multiple user accounts. This mechanism, which is preferably a software application, receives a single electronic file from the authorized sender, and posts messages to the users' accounts based upon the content of that file. For example, if a telephone company has 5,000 customers who use the system, and have authorized the company to send invoices through the system, the telephone company transmits an electronic file to the central data server, which processes the contents of the electronic file. The file can be, for example, a database file that contains user names, corresponding account authorization codes and corresponding messages for each user name. The central data server then posts each unique message in the respective account for each user, in order to avoid the need for the telephone company to hire employees to manually access each customer's account and post each message. Of course, this also works when each message is not unique, but the same message is posted to multiple users, or some combination.

The invention can incorporate advertising in its applications, and/or include paid subscriptions. It is also contemplated that by sending messages to users with known demographic profiles, advertisers can easily target and track responses by users they know to have received advertisements.

In an alternative embodiment, the invention is used to share revenue with a user. For example, an advertiser may pay 20 cents to the administrator of the system to send an advertisement to a user's announcement box. The user then receives a portion of the money or some other consideration as compensation for reading the message.

As noted above, another sub-system of the invention is a notification tool that alerts users to a message waiting in the core system via text messaging, email, sms, etc. A user signs up for this tool by entering his or her email address, telephone number or other identification. Then, upon receipt of a communication for the user, the system notifies the user by the designated means. The fact of such notification can be recorded for later evidentiary reasons.

Another sub-system of the invention is an application used to print transcripts of the communications recorded using the core communication system. There is another part of the system for encrypting messages for those choosing to use such a feature. Search and login security tools also constitute sub-systems.

The invention can log the date and time of creation of a message, the identity of the party that created the message, and can record an IP address or other identifying information for further confirmation of the sender's or receiver's identity. The invention allows users to put everything in writing in a manner similar to a signed contract, because it is clear that both parties read the communication. The invention provides evidence that is admissible in court for settling disputes about receipt of communications.

In this description, the terms "post message" and "transmit communication" and similar terms are used to refer to sending an electronic file or files to a central data server. This includes simply typing in a dialog box on a computer, uploading a graphics, text or other file to the central data server, or any other transmission of data from one data storage media to another. Thus, when the transmission of a communication is referenced, it contemplates the electronic transmission of any data from one point to another.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method of storing a communication's on a central data server, the method comprising:
   (a) a first person gaining access to an account on a central data server by sending to the central data server a first unique identification;
   (b) the first person transmitting a first communication to a communication thread in the first account on the central data server via a secure electronic connection that is substantially publically inaccessible;
   (c) the central data server receiving the first communication;
   (d) the central data server associating with the first communication at least a date of receipt of the first communication;
   (e) the central data server storing the first communication and the associated date of receipt, permitting access to any part of the first communication and the associated date of receipt only by gaining access to the communication thread of the first account, and inhibiting modification of the first communication and the associated date of receipt;
   (f) the first person authorizing at least a second person to access the communication thread of the first account; and
   (g) the central data server transmitting a notice to the second person that a communication relevant to the second person was transmitted to the central data server, wherein said notice is prohibited from informing anyone from a group consisting of the second person and any other recipient of the notice, of either or both of the following: (i) the identity of the first person or (ii) the content of the first communication;
   (h) the second person transmitting a second communication to the communication thread on the central data server via a secure electronic connection that is substantially publicly inaccessible;
   (i) the central data server receiving the second communication;
   (j) the central data server associating with the second communication at least a date of receipt of the second communication;
   (k) the central data server storing the second communication and the associated date of receipt, permitting access to the second communication and the associated date of receipt only by gaining access to the communication thread of the first account, and inhibiting any modification to the second communication and the associated date of receipt;
   (l) the central data server storing a date associated with the viewing of the first communication by the second person, permitting access to the date of viewing using the first account, and prohibiting any modification to the date of viewing;
   (m) permitting deletion of all of the communications and dates in the communication thread of the first account if the central data server receives assent by no fewer than all of the persons authorized to access the communications; and
   (n) the central data server associating with the second communication a time of receipt of the second communication;
   wherein the step of inhibiting modification of the first communication and the associated date of receipt further comprises creating a one way hash key for the first communication and associated date of receipt.

2. The method in accordance with claim 1, further comprising the step of notifying the first person that the step of notifying the second person has occurred.

3. The method in accordance with claim 1, further comprising the step of the second person viewing the first communication only after the second person sends to the central data server the second unique identification associated with the second person, and the central data server storing at least a date when the second person viewed the first communication.

4. The method in accordance with claim 3, further comprising the step of notifying the first person that the step of the second person sending to the central data server a second unique identification associated with the second person and viewing the first communication have occurred.

5. The method in accordance with claim 3, further comprising the step of notifying the first person that the second communication was posted to the communication thread without informing the first person of the content of the second communication or an identity of the second person.

6. The method in accordance with claim 5, wherein the step of notifying further comprises creating and sending the first person an email.

7. The method in accordance with claim 1, wherein, after the step of notifying the second person has been carried out, the method further comprises the central data server storing the fact of the step of notifying.

8. The method in accordance with claim 3, further comprising the step of forming a tangible record of the communications and dates in the account.

9. The method in accordance with claim 1, further comprising the step of a third person transmitting a single electronic file containing a plurality of communications for a plurality of users to the central data server, and the central data server posting the plurality of communications to respective accounts of the plurality of users.

10. The method in accordance with claim 1, further comprising the step of storing, and making available to the first person, evidence that the second person sent to the central data server a second unique identification associated with the second person, after being notified of the posting of the first communication, but did not view the first communication.

11. The method in accordance with claim 10, further comprising the step of notifying the first person that the second communication was posted to the communication thread without informing the first person of the content of the second communication or an identity of the second person.

12. The method in accordance with claim 3, wherein the step of inhibiting modification of the second communication and the associated date of receipt further comprises creating a one way hash key for the second communication and associated date of receipt.

* * * * *

UNITED STATES PATENT AND TRADEMARK OFFICE
CERTIFICATE OF CORRECTION

| | | |
|---|---|---|
| PATENT NO. | : 8,161,123 B2 | Page 1 of 1 |
| APPLICATION NO. | : 11/972872 | |
| DATED | : April 17, 2012 | |
| INVENTOR(S) | : Steven N. Verona | |

It is certified that error appears in the above-identified patent and that said Letters Patent is hereby corrected as shown below:

Column 7, line 50, Claim 1, delete "communication's", add --communications--

Column 7, line 52, Claim 1, delete "an", add --a first-- before the word "account"

Column 7, line 52, Claim 1, delete the second "a", add --the-- before the word "central"

Column 8, line 59, Claim 4, delete the second "step", add --steps-- before the word "of"

Signed and Sealed this
Fifth Day of June, 2012

David J. Kappos
*Director of the United States Patent and Trademark Office*